United States Patent

Kusumi et al.

(10) Patent No.: US 8,892,300 B2
(45) Date of Patent: Nov. 18, 2014

(54) SYSTEM AND METHOD FOR PROVIDING POWER TO AN HVAC UNIT WHEN THE VEHICLE HAS A LOW STATE OF CHARGE

(71) Applicant: Toyota Motor Engineering & Manufacturing North America, Inc., Erlanger, KY (US)

(72) Inventors: Hidetoshi Kusumi, Gardena, CA (US); Shota Hirose, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/676,034

(22) Filed: Nov. 13, 2012

(65) Prior Publication Data

US 2013/0269921 A1 Oct. 17, 2013

Related U.S. Application Data

(60) Provisional application No. 61/624,067, filed on Apr. 13, 2012.

(51) Int. Cl.
*G06F 7/00* (2006.01)
*B60H 1/00* (2006.01)
(52) U.S. Cl.
CPC ........ *B60H 1/00764* (2013.01); *B60H 1/00385* (2013.01)
USPC .............. 701/36; 700/276; 700/286; 700/291
(58) Field of Classification Search
None
See application file for complete search history.

(56) References Cited

U.S. PATENT DOCUMENTS

| | | | |
|---|---|---|---|
| 4,730,097 A | 3/1988 | Campbell et al. | |
| 5,018,362 A | 5/1991 | Nagase et al. | |
| 5,275,012 A | 1/1994 | Dage et al. | |
| 5,761,918 A | 6/1998 | Jackson et al. | |
| 6,425,253 B1 | 7/2002 | Gale et al. | |
| 6,626,003 B1 | 9/2003 | Kortum et al. | |
| 6,871,126 B2* | 3/2005 | Gorman et al. | 701/36 |
| 7,543,454 B2 | 6/2009 | Harris | |
| 7,692,409 B2 | 4/2010 | Schaper et al. | |
| 7,769,505 B2 | 8/2010 | Rask et al. | |
| 8,040,110 B2 | 10/2011 | Al-Anbuky et al. | |
| 2008/0117079 A1* | 5/2008 | Hassan | 340/901 |
| 2009/0249802 A1 | 10/2009 | Nemesh et al. | |

(Continued)

FOREIGN PATENT DOCUMENTS

| | | |
|---|---|---|
| GB | 2039173 | 11/1979 |
| JP | 2006-081394 | 3/2006 |

*Primary Examiner* — Helal A Algahaim
*Assistant Examiner* — Kelly E Darby
(74) *Attorney, Agent, or Firm* — Snell & Wilmer LLP

(57) ABSTRACT

A method and a system for changing the power consumption value available for an HVAC unit of a vehicle when an available battery power for batteries of the vehicle is low. A method and a system for non-linearly changing the power consumption value available for the HVAC unit when the available battery power decreases to a power value less than a low power value. The system can be a vehicle including batteries, an HVAC unit, an ECU and a memory. The method may include setting an HVAC power consumption value to a relatively constant power value when the available battery power is greater than a low power value and decreasing the HVAC power consumption value by a non-linear rate of power reduction when the available battery power decreases to a power value less than the low power value.

14 Claims, 2 Drawing Sheets

(56) References Cited

U.S. PATENT DOCUMENTS

2010/0280712 A1 11/2010 Bowman
2011/0140668 A1* 6/2011 Anderson ................ 320/134
2012/0235493 A1* 9/2012 Kiuchi et al. ............... 307/66

* cited by examiner

SYSTEM AND METHOD FOR PROVIDING POWER TO AN HVAC UNIT WHEN THE VEHICLE HAS A LOW STATE OF CHARGE

CROSS REFERENCE TO RELATED APPLICATIONS

This application claims the benefit and priority of U.S. Provisional Application No. 61/624,067, filed on Apr. 13, 2012, the entire contents of which are hereby incorporated by reference.

BACKGROUND

1. Field

The present invention relates to a method and a system for changing the power consumption value available for an HVAC (Heating Ventilation and Air Conditioning) unit of a vehicle when an available battery power for batteries of the vehicle is low and more particularly to a method and a system for non-linearly changing the power consumption value available for the HVAC unit when the available battery power decreases to a power value less than a low power value.

2. Description of the Related Art

In order to improve a user's experience and safety with a vehicle having rechargeable batteries, manufacturers have sought novel ways to enhance the operation of various units of the vehicle when the user is travelling with the vehicle with a low available battery power/state of charge. Because each of the various units of the vehicle require a certain power value for their operations, it is important to determine a power allocation for the units based on the needs of the user and the vehicle. A vehicle can incorporate an HVAC unit which controls the climate inside the vehicle and adjusts the environmental comfort for the user. An HVAC unit may also perform defogging/defrosting operations for windows of the vehicle depending on the vehicle's speed, humidity, temperature and other climate conditions. A vehicle generally decreases the power consumption value available for the HVAC unit and other devices of the vehicle by linear rates of power reduction relative to a reduction in the available battery power.

A drawback of linearly decreasing the power consumption value available for the HVAC unit has been that the power allocation to the HVAC unit may be insufficient because the HVAC unit may require a greater allocated power when the available battery power is low. For example, under cold or humid climate conditions, a sudden decrease in the power consumption value available for the HVAC unit may hinder the window defogging/defrosting operations of the HVAC unit which may be important for enhancing the field of vision of the user.

Another drawback of linearly decreasing the power consumption value available for the HVAC unit has been that the power allocation to the HVAC unit may be inefficient because the HVAC unit may require less power than the allocated power consumption value. For example, under ideal climate conditions and a low vehicle speed, the HVAC unit may require less power than the power consumption value allocated under the linear reduction method or system. The inefficient allocation of power may hinder the operation of the vehicle given that other devices of the vehicle could have used the unnecessary power allocated to the HVAC unit.

Thus, there is a need for a method and a system directed to changing the power consumption value available for an HVAC unit of a vehicle when an available battery power is low and more particularly to a method and a system for non-linearly changing the power consumption value available for the HVAC unit when the available battery power decreases to a power value less than a low power value. There is also a need for a method and a system directed to decreasing the power consumption value available for an HVAC unit by an initial slow rate for avoiding a sudden or abrupt reduction in the power available for the HVAC unit.

SUMMARY

The present invention relates to a method and system for changing the power consumption value available for an HVAC (Heating Ventilation and Air Conditioning) unit of a vehicle when an available battery power for batteries of the vehicle is low and more particularly to a method and a system for non-linearly changing the power consumption value available for the HVAC unit when the available battery power decreases to a power value less than a low power value.

In one embodiment, the present invention may be, for example, a computer-based method for regulating power to an HVAC unit of a vehicle, including: setting, using a processor, an HVAC power consumption value for supplying power from a battery of the vehicle having an available battery power to the HVAC unit of the vehicle; setting, using the processor, the HVAC power consumption value to a relatively constant power value when the available battery power is greater than a first low power value; decreasing, using the processor, the HVAC power consumption value by a non-linear rate of power reduction which varies based on the available battery power when the available battery power decreases to a power value less than the first low power value and greater than a second low power value; and decreasing, using the processor, the HVAC power consumption value by a linear rate of power reduction when the available battery power decreases to a power value less than the second low power value.

In another embodiment, the present invention may be a computer-based method for regulating power to an HVAC unit of a vehicle, including: setting, using a processor, an HVAC power consumption value for supplying power from a battery of the vehicle having an available battery power to the HVAC unit of the vehicle; setting, using the processor, the HVAC power consumption value to a relatively constant power value when the available battery power is greater than a first low power value; and decreasing, using the processor, the HVAC power consumption value by a plurality of rates of power reduction when the available battery power is less than the first low power value.

In yet another embodiment, the present invention may be a vehicle, including: an HVAC unit configured to perform defogging or defrosting operations for a window of the vehicle; a battery having an available battery power for providing power to the HVAC unit; a processor coupled to the battery and the HVAC unit and configured to: set an HVAC power consumption value for supplying power from the battery to the HVAC unit; set the HVAC power consumption value to a relatively constant power value when the available battery power is greater than a first low power value; decrease the HVAC power consumption value by a non-linear rate of power reduction which varies based on the available battery power when the available battery power decreases to a power value less than the first low power value and greater than a second low power value; and decrease the HVAC power consumption value by a linear rate of power reduction when the available battery power decreases to a power value less than the second low power value.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
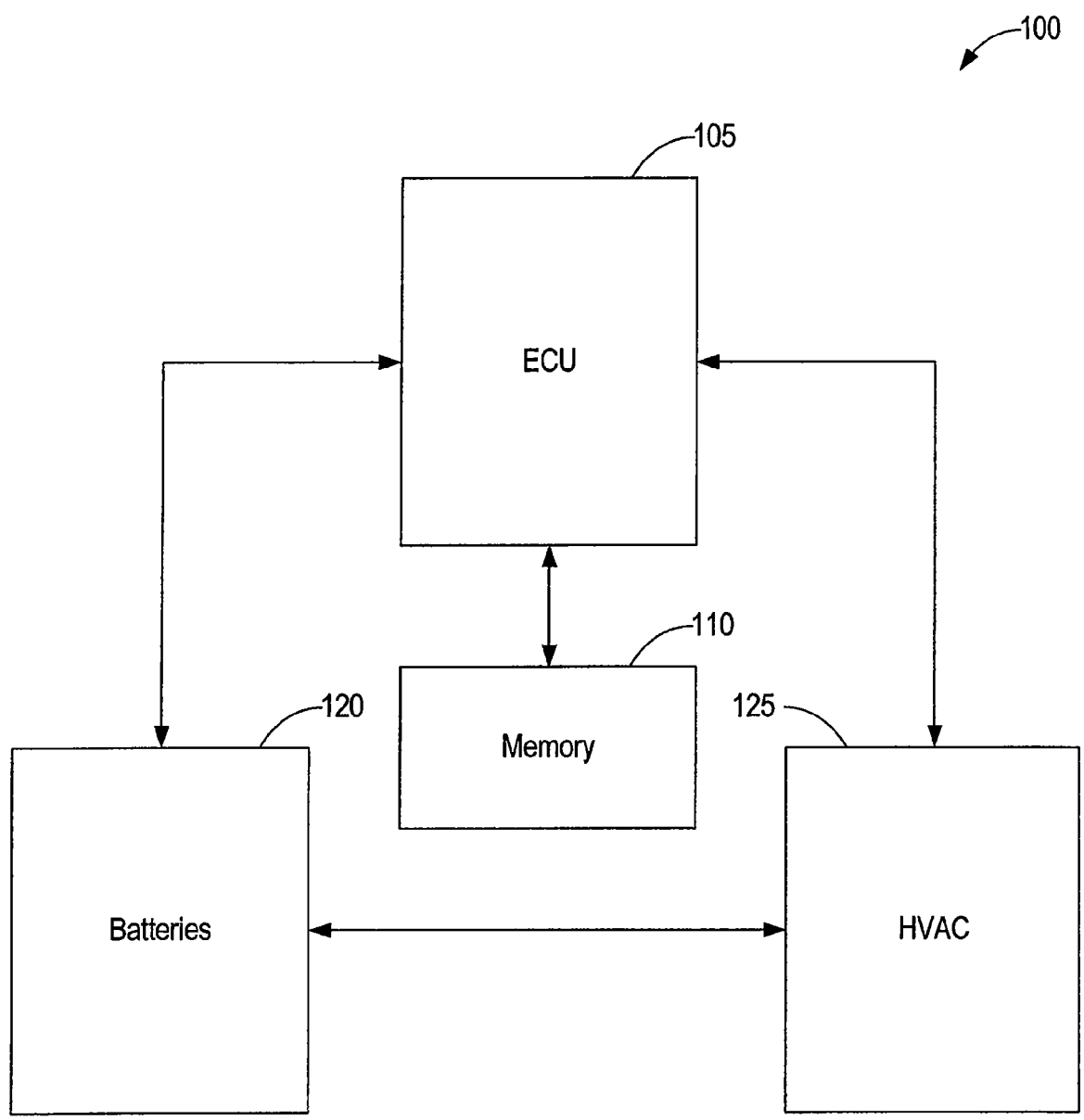
FIG. 1 is a block diagram of an HVAC control system of a vehicle according to an embodiment of the present invention.

Referring to FIG. 1, a block diagram is shown of a system 100 of a vehicle according to an embodiment of the present invention which may include an Electronic Control Unit (ECU) 105 (e.g., a processor), a memory 110, batteries 120, and an HVAC unit 125 (e.g., an HVAC defroster unit).

The batteries 120 may include rechargeable batteries that may be employed in an electric or a hybrid vehicle. In another embodiment, the batteries 120 may be a single battery including battery cells. The stored energy in the batteries 120 may be obtained via charging, regenerative braking or other means. In another embodiment, the ECU 105 or a separate processor such as a BMS (Battery Management System) may determine the state of charge of the batteries 120 using sensors connected to the cells of the batteries 120. The sensors may measure a voltage, a current, a temperature, charge acceptance, an internal resistance, self-discharges, magnetic properties, a state of health and/or other states or parameters of the batteries 120. In other embodiments, a state of charge of the batteries 120 may be determined by coulomb counting, quantum mechanism, impedance spectroscopy, a hydrometer or using other devices or methods without limiting the scope of the present invention.

In one embodiment, the BMS communicates the available battery power to the ECU 105 by transmitting an electronic signal. The BMS may periodically update the current available battery power (e.g., every 500 milliseconds). The ECU 105 determines the power consumption value allocated for the HVAC unit 125. The BMS or the ECU 105 may transmit control signals to relays for selectively activating a connection of the batteries 120 to various loads positioned inside the vehicle. The loads can be, for example, the HVAC unit 125 or various other units or devices of the vehicle having programmable memory items. The ECU 105 may use data sequences stored as look-up tables or algorithms in the memory 110 in order to determine a power consumption value for each of the devices or units of the vehicle including the HVAC unit 125.

The HVAC unit 125 is capable of performing defogging/defrosting operations on a window or a windshield of the vehicle. The power consumption value required by the HVAC unit 125 depends on the climate control and defogging/defrosting operations required to be performed under the current climate conditions and the vehicle speed. The windshield or window fogging may reduce or block the field of vision of the user of the vehicle. Fogging may occur, for example, due to a rise in humidity of the passenger compartment or due to the fall of the windshield or window temperature. Under conditions of excess moisture, high humidity, rainfall, trapped moisture in the passenger compartment or other conditions leading to fogging of the windows or windshield, the HVAC unit 125 may require a greater power consumption value for the defogging/defrosting operations. For example, the HVAC unit 125 of a mid-size vehicle may require between 5 kWatts and 7 kWatts of power, at a minimum, to perform the operations.

The user may activate the HVAC unit 125 manually to perform the defogging/defrosting operations, for example, after the user has noticed that the windows are fogged. Alternatively, the HVAC unit 125 may be activated, automatically and without any user interference, when the ECU 105 detects that fogging has occurred. For example, the ECU 105 or the HVAC unit 125 may be coupled to sensors that measure the window and ambient temperatures, the vehicle velocity and/or the cabin humidity to determine whether to activate the defogging/defrosting operations of the HVAC unit 125. Other HVAC and defogging/defrosting units known in the art may be incorporated in the system 100 without limiting the scope of the present invention.

As the available battery power decreases to a first low power value, the system 100 seeks to avoid an abrupt change in the functioning of the HVAC unit 125 for ensuring that the HVAC unit 125 has an adequate power consumption value for the defogging/defrosting operations if such operations are necessary under the current climate conditions and the vehicle velocity because a sudden decrease may hinder the defogging/defrosting operations. For example, if the surface of a window of the vehicle is cooler than the dew point temperature of air in contact with the window, fogging may occur and a higher power consumption value would be needed for the HVAC unit 125 as compared with a vehicle in ideal humidity, temperature and other climate conditions. As such, it would be desirable to allow a gradual decrease in the power consumption value available for the HVAC unit 125 in order to enhance the vision of the user under these conditions. Furthermore, if the vehicle is travelling at a high speed, the HVAC unit 125 may require a higher power under these climate conditions in order to perform the defogging/defrosting operations. Typically, the HVAC unit 125 consumes a fixed constant amount of power, e.g., 6 kWatts or 7 kWatts, for its operations (see e.g., zone C in FIG. 2). The system 100 is capable of adjusting the power consumption value available for the HVAC unit 125 based on the factors and parameters set forth above when the available battery power is low.

In one embodiment, the ECU 105, the batteries 120, the HVAC unit 125 and/or the BMS communicate using transmission of electronic signals through a Control Area Network (CAN) bus. In other embodiments, the communication may be over various other types of serial communication links, direct wirings, digital communication buses, wireless communications or other communication links. Other systems or methods known in the art for communication between the ECU 105, the batteries 120, the HVAC unit 125 and/or the BMS may be utilized in the system 100 without limiting the scope of the present invention.

Figure 2:
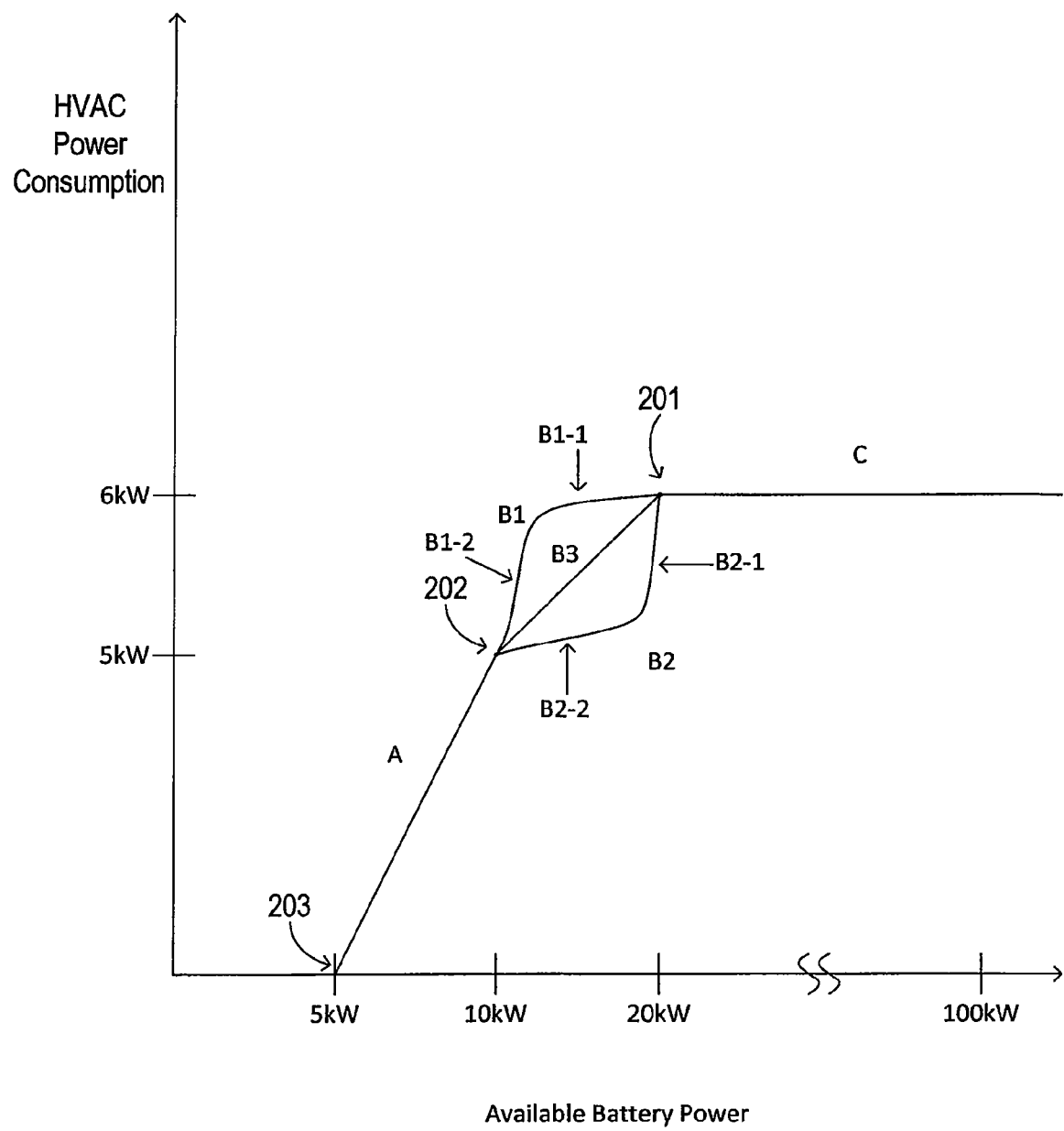
FIG. 2 is a graph depicting the reduction or regulation of power consumption value of the HVAC unit when the batteries have low power according to an embodiment of the present invention.

FIG. 2 is a graph showing the regulation of power consumption by the ECU 105 of the HVAC unit 125 when the batteries 120 have a low available battery power according to an embodiment of the present invention. The x-axis denotes the available battery power of the batteries 120 for all of the devices of the vehicle, and the y-axis denotes the power consumption value allocated for the HVAC unit 125. FIG. 2 depicts three alternative rates of power reduction for the HVAC unit 125 shown as B1, B2 or B3.

The memory 110 may store an algorithm or a table that is used by the ECU 105 to control the reduction of power of the HVAC unit 125 as the available battery power reaches a minimum vehicle power value 203. In one embodiment, the algorithm may include instructions that are read and executed by the ECU 105 to provide power to the HVAC unit 125, and the table may include low power values 201 and 202 and the minimum vehicle power value 203. The power values 201, 202 and 203 are determined based on the power requirements for the HVAC unit 125 and the vehicle, the temperature, the humidity, the size of the vehicle, the vehicle's maximum velocity and acceleration under a particular available battery power and/or other factors and parameters with respect to the vehicle and climate conditions. The power values provided in FIG. 2 correspond to a mid-size vehicle.

The portion of the graph denoted by B1-1 in FIG. 2 corresponds to a preliminary slow rate of power reduction of the HVAC unit 125 when climate conditions and/or vehicle speed demand maintaining a high power consumption value for the HVAC unit 125 as the available battery power decreases below the first low power value 201 (e.g., 20 kWatts). The HVAC unit 125 generally consumes a maximum of 6 or 7 kWatts of power. As the available battery power decreases to a power value less than or equal to the first low power value 201, the vehicle enters a power save (or saving) mode. Under the B1 non-linear rate of power reduction, the ECU 105 reduces or regulates power to the HVAC unit 125 by a rate that varies based on the available battery power, while simultaneously maintaining a driver's ability to drive safely at a reasonable vehicle speed that is achievable with the low power. For example, the ECU 105 may provide more power for the HVAC unit 125 initially as shown by the preliminary B1-1 portion of the B1 graph in FIG. 2 as compared with the concluding portion B1-2. When the available battery power reduces to a power number below a middle power value (between the first power value 201 and the second power value 202), the ECU 105 then tapers off the power consumption value of the HVAC unit 125 as shown by the B1-2 portion of graph B1 until the available battery power reaches the second low power value 202 (e.g., 10 kWatts).

As such, the rate of power reduction in the B1 graph varies depending on the available battery power with an initial slower decrease when the available battery power is closer to the first low power value 201 as depicted by B1-1 in FIG. 2. The non-linear reduction in power in graph B1 is tailored to the needs of the HVAC unit 125 because the HVAC unit 125 is provided greater power initially to better perform the defogging/defrosting operations while still being controlled by the ECU 105 to use less power as the available battery power diminishes. This non-linear reduction in power occurs until the available battery power reaches the second low power value 202, at which time the HVAC unit 125 has a linear reduction in power (zone A) until the available battery power reaches the minimum vehicle power value 203 (e.g., 5 kWatts of power). When the available battery power is less than or equal to the minimum vehicle power value 203, the power consumption for the HVAC unit 125 is cut off due to lack of available battery power because the system 100 provides at least the minimum vehicle power value 203 (e.g., 5 kWatts) for other devices excluding the HVAC unit 125.

Alternatively, under the B2 and B3 graphs as depicted in FIG. 2, the system 100 does not allocate a high power value to the operations of the HVAC unit 125 over other devices of the vehicle. Graphs B2 and B3 correspond to more rapid rates of power reduction of the power consumption value for the HVAC unit 125 as compared with graph B1 in order to efficiently allocate power to the HVAC unit 125 when the vehicle is travelling at a low speed and/or under relatively ideal climate conditions. Because the HVAC unit 125 does not require a high power consumption value under such conditions, more power can be allocated to other devices of the vehicle. For example, the HVAC unit 125 may not require more than 5 kWatts of power under low speed conditions. As such, the ECU 105 may decrease the power consumption value available for the HVAC unit 125 at a greater and more rapid rate as compared with B1 in order to reach a value close to 5 kWatts for maintaining more power for other devices of the vehicle. As such, the non-linear reduction under B2 and the linear reduction under B3 may allocate more power to other units or devices of the vehicle when the HVAC unit 125 does not require a high power consumption value.

Graphs B1 and B2 as shown in FIG. 2 may have a single mathematical critical point. Graph B3 is a linear graph with a relatively constant rate of power reduction when the available battery power is between 10 kWatts and 20 kWatts. In other embodiments, graphs B2 and B3 may have numerous portions with various rates and mathematical critical points. Various other rates of power reduction and number of critical points may be utilized based on the available battery power in order to provide more power to the HVAC unit 125 when a high power consumption value is required and less power when the conditions do not demand a high power consumption value without limiting the scope of the present invention.

The reduction in power for the HVAC unit 125 is linear in zone A. In yet another embodiment, the reduction may be non-linear and used along with either of the alternatives B1, B2 and B3. In zone C, the ECU 105 provides a relatively constant power (e.g., a power value between 6 kWatts and 7 kWatts) for the HVAC unit 125 in order to maintain the operation of the HVAC unit 125 when the available battery power is not low. In other embodiments, the HVAC unit 125 may be provided with varying power consumption values in zone C without limiting the scope of the invention. For example, the power consumption value available for the HVAC unit 125 may be changed linearly or non-linearly in zone C in order to adjust the power consumption value to the power needs of the HVAC unit 125 under the current climate conditions and vehicle speed.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

What is claimed is:

1. A computer-based method for regulating power to an HVAC unit of a vehicle, comprising:
   setting, using a processor, an HVAC power consumption value for supplying power from a battery of the vehicle having an available battery power to the HVAC unit of the vehicle;
   decreasing, using the processor, the HVAC power consumption value at a preliminary rate of power reduction when the available battery power is less than a first low power value and greater than an in-between low power value which is a power value between the first power low power value and a second low power value;
   decreasing, using the processor, the HVAC power consumption value at a concluding rate of power reduction when the available battery power is less than the in-between low power value and greater than the second low power value, the preliminary rate of power reduction being greater than the concluding rate of power reduction; and
   decreasing, using the processor, the HVAC power consumption value at a linear rate of power reduction when the available battery power decreases to a power value less than the second low power value.

2. The method of claim 1 wherein the linear rate of power reduction is determined such that no power is provided to the HVAC unit when the available battery power reduces to a minimum vehicle power value.

3. The method of claim 1 further comprising setting, using the processor, the HVAC power consumption value to a relatively constant power value when the available battery power is greater than the first low power value.

4. A computer-based method for regulating power to an HVAC unit of a vehicle, comprising:
   setting, using a processor, an HVAC power consumption value for supplying power from a battery of the vehicle having an available battery power to the HVAC unit of the vehicle;
   decreasing, using the processor, the HVAC power consumption value at a non-linear rate of power reduction which varies based on the available battery power when the available battery power decreases to a power value less than a first low power value and greater than a second low power value, the first low power value being between 16 kWatts and 24 kWatts, and the second low power value being between 6 kWatts and 14 kWatts; and
   decreasing, using the processor, the HVAC power consumption value at a linear rate of power reduction when the available battery power decreases to a power value less than the second low power value.

5. The method of claim 4 wherein the step of decreasing, using the processor, the HVAC power consumption value at the non-linear rate of power reduction includes:
   decreasing, using the processor, the HVAC power consumption value at a preliminary rate of power reduction when the available battery power is less than the first low power value and greater than an in-between low power value which is a power value between the first and the second low power values, and
   decreasing, using the processor, the HVAC power consumption value at a concluding rate of power reduction when the available battery power is less than the middle in-between low power value and greater than the second low power value,
   wherein the preliminary rate of power reduction is less than the concluding rate of power reduction for avoiding a sudden reduction of the HVAC power consumption value for an operation of the HVAC unit.

6. A vehicle, comprising:
   an HVAC unit;
   a battery having an available battery power for providing power to the HVAC unit; and
   a processor coupled to the battery and the HVAC unit, the processor configured to:
     set an HVAC power consumption value for supplying power from the battery to the HVAC unit,
     decrease the HVAC power consumption value at a preliminary rate of power reduction when the available battery power is less than a first low power value and greater than an in-between low power value which is a power value between the first power value and a second low power value,
     decrease the HVAC power consumption value at a concluding rate of power reduction when the available battery power is less than the in-between low power value and greater than the second low power value, the preliminary rate of power reduction being greater than the concluding rate of power reduction, and
     decrease the HVAC power consumption value at a linear rate of power reduction when the available battery power decreases to a power value less than the second low power value.

7. The vehicle of claim 6 wherein the linear rate of power reduction is determined such that no power is provided to the HVAC unit when the available battery power reduces to a minimum vehicle power value.

8. The vehicle of claim 6 wherein the processor is further configured to set the HVAC power consumption value to a relatively constant power value when the available battery power is greater than the first low power value.

9. A computer-based method for regulating power to an HVAC unit of a vehicle, comprising:
   setting, using a processor, an HVAC power consumption value for supplying power from a battery of the vehicle having an available battery power to the HVAC unit of the vehicle;
   decreasing, using the processor, the HVAC power consumption value at a preliminary rate of power reduction when the available battery power is less than a first low power value and greater than an in-between low power value which is a power value between the first power low power value and a second low power value;
   decreasing, using the processor, the HVAC power consumption value at a concluding rate of power reduction when the available battery power is less than the in-between low power value and greater than the second low power value, wherein the preliminary rate of power reduction is set to be less than the concluding rate of power reduction for supplying at least enough power from the battery to the HVAC unit to perform a current HVAC operation and for avoiding a sudden reduction of the HVAC power consumption; and decreasing, using the processor, the HVAC power consumption value at a linear rate of power reduction when the available battery power decreases to a power value less than the second low power value.

10. The method of claim 9 wherein the preliminary rate of power reduction is less than the linear rate of power reduction.

11. The method of claim 9 further comprising setting, using the processor, the HVAC power consumption value to a relatively constant power value when the available battery power is greater than the first low power value.

12. The method of claim 9 wherein the linear rate of power reduction is determined such that no power is provided to the HVAC unit when the available battery power reduces to a minimum vehicle power threshold value.

13. The method of claim 9 wherein the first low power value is between 16 kWatts and 24 kWatts.

14. The method of claim 9 wherein the second low power value is between 6 kWatts and 14 kWatts.

* * * * *